United States Patent
Nagai et al.

(10) Patent No.: US 10,763,483 B2
(45) Date of Patent: Sep. 1, 2020

(54) BATTERY PACK

(71) Applicant: TOYOTA JIDOSHA KABUSHIKI KAISHA, Toyota-shi, Aichi-ken (JP)

(72) Inventors: Hiroki Nagai, Ama-gun (JP); Koji Tamaru, Toyota (JP); Ryo Kagami, Ichinomiya (JP); Yuki Okamoto, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/946,997

(22) Filed: Apr. 6, 2018

(65) Prior Publication Data
US 2018/0294465 A1    Oct. 11, 2018

(30) Foreign Application Priority Data

Apr. 10, 2017    (JP) .................................. 2017-077840

(51) Int. Cl.
| | | |
|---|---|---|
| H01M 2/20 | (2006.01) | |
| H01M 2/30 | (2006.01) | |
| H01M 10/42 | (2006.01) | |
| H01M 10/0525 | (2010.01) | |
| H01M 2/26 | (2006.01) | |
| H01M 2/10 | (2006.01) | |
| B60L 50/64 | (2019.01) | |

(52) U.S. Cl.
CPC ......... *H01M 2/206* (2013.01); *H01M 2/1077* (2013.01); *H01M 2/266* (2013.01); *H01M 2/30* (2013.01); *H01M 10/0525* (2013.01); *H01M 10/4207* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 9,673,430 | B2 * | 6/2017 | Seto | .................... H01M 2/1077 |
| 2002/0119367 | A1 * | 8/2002 | Watanabe | ............... H01M 2/18 |
| | | | | 429/129 |

(Continued)

FOREIGN PATENT DOCUMENTS

| | | |
|---|---|---|
| JP | 2001-062575 A | 3/2001 |
| JP | 2002252023 A | 9/2002 |
| JP | 2012-130935 A | 7/2012 |

(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

The battery pack disclosed herein includes a plurality of unit cells. The plurality of unit cells is connected to each other by a bus bar. The bus bar has two terminal connection portions and a linking portion. A linear welded portion is formed in a portion where the terminal connection portions and the external terminals overlap with each other. The linear welded portion is non-annular in the plane of the terminal connection portions and has a straight linear portion extending in a direction orthogonal to the arrangement direction, and two circular arc portions that extend from respective ends of the straight linear portion and are curved toward a side opposite to the side where the linking portion is located.

6 Claims, 6 Drawing Sheets

(56) References Cited

U.S. PATENT DOCUMENTS

2014/0377625 A1\* 12/2014 Tsutsumi ............ H01M 2/206
                                                         429/121
2015/0243947 A1    8/2015 Seto et al.

FOREIGN PATENT DOCUMENTS

WO      2014/050329 A1    4/2014
WO      2014/064888 A1    5/2014

\* cited by examiner

BATTERY PACK

CROSS-REFERENCE

This application claims priority based on Japanese Patent Application No. 2017-077840 filed on Apr. 10, 2017, the entire contents of which are incorporated herein by reference.

BACKGROUND OF THE INVENTION

1. Field of the Invention

The present teaching relates to a battery pack. More specifically, the present teaching relates to a battery pack in which a plurality of unit cells is arranged, the unit cells being secondary batteries.

2. Description of the Related Art

A battery pack including a plurality of unit cells, each unit cell being a secondary battery such as a lithium ion secondary battery or a nickel hydride battery or a storage element such as a capacitor, is gaining importance as a power source to be mounted on a vehicle or a power source for a personal computer, a portable terminal, and the like. In particular, a battery pack using a lithium ion secondary battery, which is lightweight and capable of obtaining a high energy density, as a unit cell is desirably used for a high output power source mounted on a vehicle.

Such a battery pack is constructed, for example, by arranging each of a plurality of unit cells along a predetermined arrangement direction and electrically connecting external terminals of adjacently disposed unit cells with a bus bar. For example, a plate-shaped conductive member is used for the bus bar used for constructing the battery pack. An example of a battery pack in which a plurality of unit cells is connected by a bus bar is described in WO 2014/050329.

SUMMARY OF THE INVENTION

WO 2014/050329 suggests a battery module in which a plurality of power storage elements is connected by a bus bar and in which a thin wall portion formed in the bus bar and the external terminal of the power storage element are welded together by irradiating the thin wall portion with a laser beam along the entire circumference of a closed rectangular path at a position separated inward by a predetermined distance from the inside surface portion of the thin wall portion, or along a plurality of linear sides. This document indicates that such a configuration can reduce thermal damage to the external terminal of the power storage element. However, when a battery pack in which an external terminal of a unit cell and a bus bar are fixed by welding, as in WO 2014/050329, is mounted on a moving body such as a vehicle, the unit cells constituting the battery pack may move relative to each other due to vibrations during movement or impacts from the outside, stress may be repeatedly applied to the welded portion between the bus bar and the external terminal, and the welded portion may be damaged. Breakage of the welded portion is undesirable since it can result in the detachment of the bus bar from the external terminal.

The present teaching has been made in view of the above issues, and it is a main object of the present teaching to provide a battery pack in which breakage of a welded portion between a bus bar and an external terminal can be suppressed.

The battery pack suggested herein is configured by arranging a plurality of unit cells in a predetermined direction. This battery pack includes a plurality of unit cells each including an electrode body having a positive electrode and a negative electrode, a battery case accommodating the electrode body, and external terminals attached to the outside of the battery case. In the plurality of unit cells, one external terminal and another external terminal are linked to each other by a bus bar between the adjacent unit cells. The bus bar is a plate-shaped member extending in the arrangement direction and has a pair of terminal connection portions which overlap the respective external terminals, and a linking portion for linking the pair of terminal connection portions. A linear welded portion is formed in a portion where the terminal connection portion of the bus bar and the external terminal overlap with each other. The linear welded portion is non-annular in a plane of the terminal connection portion, and has a straight linear portion that extends in a direction orthogonal to the arrangement direction, and two circular arc portions that extend from respective ends of the straight linear portion and are curved toward a side opposite to the side where the linking portion is located. With such a configuration, breakage of the welded portion between the bus bar and the external terminal can be effectively suppressed.

In the present description, the term "unit cell" is used to refer to individual power storage elements that can be connected in series with each other to constitute a battery pack, and is inclusive of batteries and capacitors of various compositions unless otherwise specified. "Secondary battery" generally refers to a battery that can be repeatedly charged, and is inclusive of a so-called storage battery such as a lithium ion secondary battery and a nickel hydride battery.

A storage element constituting a lithium ion secondary battery is a typical example of the "unit cell" referred to herein, and a lithium ion secondary battery module including a plurality of such unit cells is a typical example of the "battery pack" disclosed herein.

In a desired embodiment of the battery pack disclosed herein, the straight linear portion is formed at a position displaced, in the arrangement direction, from a center point of a portion where the terminal connection portion of the bus bar and the external terminal overlap with each other. This makes it easier to ensure the space for reworking the welded portion and preliminary welding.

In a desired embodiment of the battery pack disclosed herein, the relationship between the length L of the straight linear portion in the direction perpendicular to the arrangement direction and the radius R of the circular arc portion satisfies (R/L)<0.2. With such a relationship between the length L of the straight linear portion and the radius R of the circular arc portion, the breakage of the weld portion can be suppressed more effectively.

In a desired embodiment of the battery pack disclosed herein, a central angle θ of the circular arc portion is 30 degrees or more and 120 degrees or less. Within this range of the central angle θ of the circular arc portion, breakage of the welded portion can be suppressed more effectively.

DETAILED DESCRIPTION OF THE INVENTION

Figure 1:
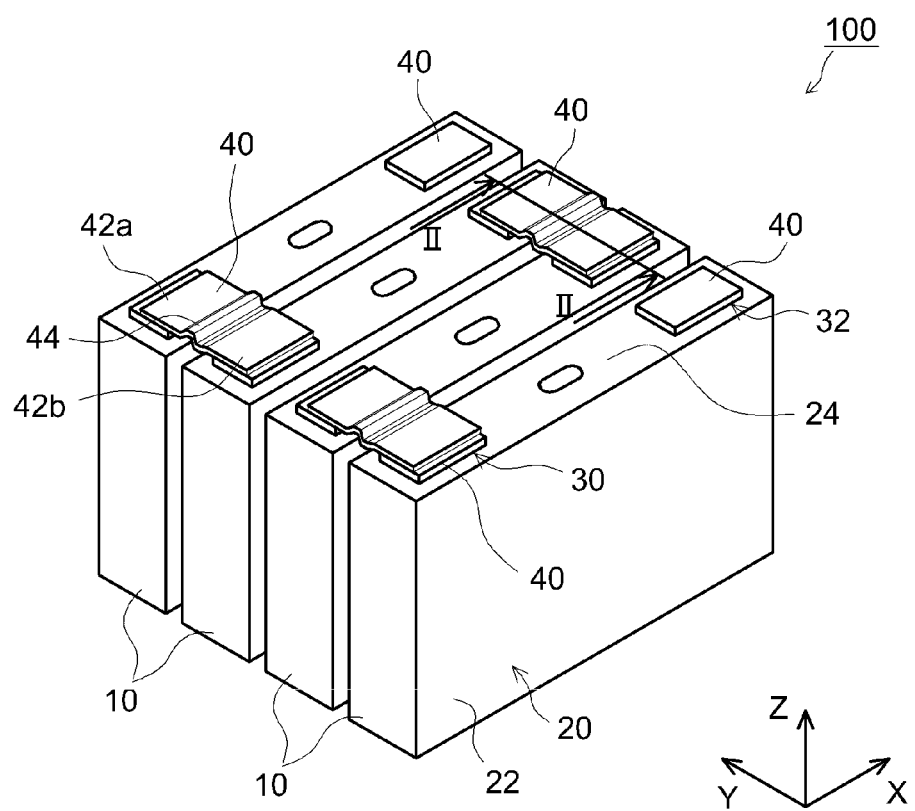
FIG. 1 is a perspective view schematically showing a battery pack according to one embodiment.

Embodiments of the present teaching will be described below with reference to the drawings. Matters which are other than those particularly mentioned in the present specification, but are necessary for the implementation of the present teaching (for example, the general configuration and manufacturing process of the electrode body not characterizing the present teaching) can be grasped as design matters for a person skilled in the art which are based on the related art in the pertinent field. The present teaching can be carried out based on the contents disclosed in this description and technical common sense in the pertinent field. Further, in the following drawings, the same reference numerals are assigned to members and parts that exhibit the same action. Further, the dimensional relationship (length, width, thickness, etc.) in each drawing does not reflect the actual dimensional relationship. In the description, A to B means A or more and B or less.

The battery pack according to the present teaching may be one in which the unit cell is a rechargeable secondary battery and the battery pack is formed by connecting a plurality of such unit cells in series, and the configuration of the unit cell is not particularly limited. A nickel hydride battery, an electric double layer capacitor, and the like exemplify the configuration of a unit cell suitable for carrying out the present teaching. A lithium ion secondary battery is a configuration of a unit cell particularly suitable for carrying out the present teaching. Since the lithium ion secondary battery is capable of realizing high output with high energy density, it is possible to construct a high-performance battery pack, in particular, a battery pack (battery module) to be mounted on a vehicle.

The present teaching will be described hereinbelow in greater detail by using a lithium ion secondary battery as an example of a battery configuration, but this example is not intended to be particularly limiting.

Figure 2:
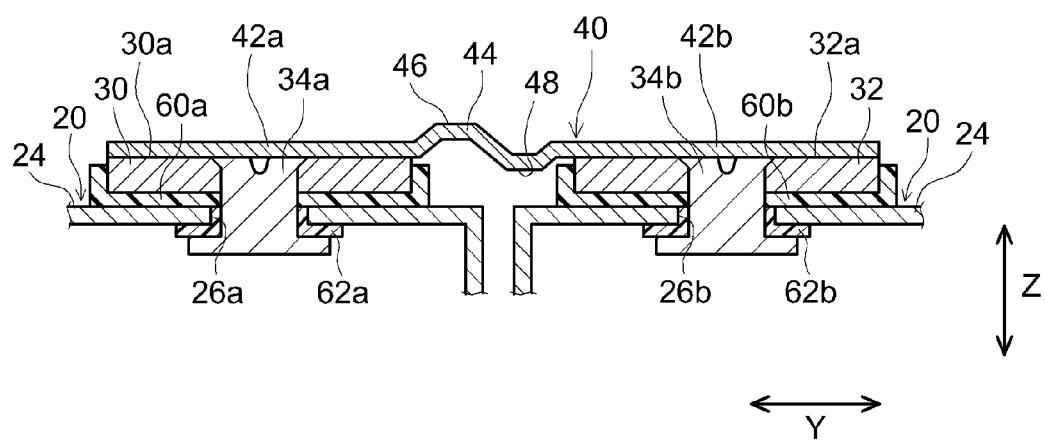
FIG. 2 is a view schematically showing a cross section taken along the line II-II in FIG. 1.

FIG. 1 is a perspective view schematically showing a battery pack 100 according to the present embodiment. FIG. 2 is a view schematically showing a cross section taken along the line II-II in FIG. 1. As shown in FIG. 1 and FIG. 2, the battery pack 100 is configured by arranging a plurality of (four in FIG. 1) chargeable/dischargeable unit cells 10 in a predetermined direction. The adjacently arranged unit cells 10 are electrically connected to each other by a bus bar 40. In the following description, the arrangement direction in which the unit cells 10 are arranged side by side is referred to as a direction Y, the height direction of the unit cell 10 is referred to as a direction Z. and a width direction which is perpendicular to the direction Y and the direction Z and is along the long side of the unit cell 10 is referred to as a direction X. However, these definitions are for the sake of convenience of explanation and do not limit the embodiment of installation of the battery pack 100.

Similarly to the unit cell installed in the conventional battery pack, each of the plurality of unit cells 10 typically includes an electrode body (not shown) having predetermined battery constituent materials, a battery case 20 accommodating the electrode body, and external terminals 30, 32 attached to the outside of the battery case 20.

The electrode body typically has a positive electrode, a negative electrode, and an electrolyte. The positive electrode and the negative electrode each include an active material capable of reversibly occluding and releasing charge carriers. In the case of a lithium ion secondary battery, the charge carriers are lithium ions. The electrolyte includes, for example, a nonaqueous solvent and a supporting salt such as a lithium salt.

The battery case 20 is a container that accommodates the electrode body and the electrolyte. In the present embodiment, the battery case 20 has a box-like (rectangular parallelepiped shape) outer shape. In this embodiment, the battery case 20 is configured of a flat case main body 22 with an open upper surface, and a lid 24, which closes the opening of the upper surface. The material of the battery case 20 is not particularly limited as long as it is the same as that used in the conventional unit cell. From the viewpoint of suitability for mounting on a vehicle or the like, a material that is relatively lightweight is suitable for implementing this configuration. For example, a case made of a metal (for example, aluminum, steel), a case made of a synthetic resin (for example, a polyolefin resin such as polyethylene, polypropylene, and the like, or a high-melting-point resin such as polyethylene terephthalate, polytetrafluoroethylene, a polyamide resin, and the like) can be suitably used. The case 20 according to the present embodiment is made of aluminum.

External terminals 30, 32 are attached to the upper surface (here, lid 24) of the battery case 20. In this example, the external terminal 30 is the positive electrode terminal 30. The external terminal 32 is the negative electrode terminal 32. The positive electrode terminal 30 and the negative electrode terminal 32 are disposed at both end portions of the unit cell 10 in the width direction X (left-right direction in FIG. 1). The positive electrode terminal 30 is made of a metal, for example, such as aluminum, nickel, stainless steel, and the like. The positive electrode terminal 30 is electrically connected to a positive electrode disposed inside the battery case. The negative electrode terminal 32 is made of a metal, for example, such as copper, nickel, stainless steel, and the like. From the viewpoint of weldability, the negative electrode terminal 32 may be made of aluminum or a clad of aluminum and copper. The negative electrode terminal 32 is electrically connected to a negative electrode disposed inside the battery case.

The positive electrode terminal 30 and the negative electrode terminal 32 are each formed in a flat plate shape with a rectangular upper end. The positive electrode terminal 30 and the negative electrode terminal 32 each have flat surfaces 30a and 32a parallel to the upper surface (here, the lid 24) of the unit cell 10. In this embodiment, the length of the positive electrode terminal 30 in the width direction X is larger than the length of the positive electrode terminal 30 in the arrangement direction Y. The length of the negative electrode terminal 32 in the width direction X is larger than the length in the arrangement direction Y. However, the shapes, sizes, arrangements, and the like of the positive electrode terminal 30 and the negative electrode terminal 32 are not particularly limited, and can be appropriately changed. The thickness of the portions of the flat surfaces 30a, 32a of the positive electrode terminal 30 and the negative electrode terminal 32 is not particularly limited, and may be, for example, 0.5 mm to 10 mm, typically 1 mm to 8 mm, for example, 2 mm to 6 mm.

The positive electrode terminal 30 is electrically connected to the positive electrode in the battery case 20. That is, a terminal hole 26a that communicates the inside and the outside of the battery case 20 is provided on the upper surface (here, the lid 24) of the battery case 20. A rivet 34a is inserted into the terminal hole 26a and fitted therein. The rivet 34a is fixed to the lid 24 of the battery case 20 by bending the upper end and the lower end thereof. The rivet 34a is electrically connected to a positive electrode (not shown) inside the battery case 20. A part of the outer peripheral surface of the rivet 34a is in contact with the positive electrode terminal 30 outside the battery case. As a result, a conductive path from the positive electrode to the positive electrode terminal 30 is formed.

The negative electrode terminal 32 is electrically connected to the negative electrode in the battery case 20. The negative electrode terminal 32 has the same configuration as the positive electrode terminal 30. That is, a terminal hole 26b that communicates the inside and the outside of the battery case 20 is provided on the upper surface (here, the lid 24) of the battery case 20. A rivet 34b is inserted into the terminal hole 26b and fitted therein. The rivet 34b is fixed to the lid 24 of the battery case 20 by bending the upper end and the lower end thereof. The rivet 34b is electrically connected to a negative electrode (not shown) inside the battery case 20. A part of the outer peripheral surface of the rivet 34b is in contact with the negative electrode terminal 32 outside the battery case. As a result, a conductive path from the negative electrode to the negative electrode terminal 32 is formed.

A conductive path extending from the positive electrode to the positive electrode terminal 30 at the peripheral edge portion of the terminal hole 26a is insulated from the battery case 20 by a first insulating member 60a and a second insulating member 62a. A conductive path from the negative electrode to the negative electrode terminal 32 at the peripheral edge portion of the terminal hole 26b is insulated from the battery case 20 by a first insulating member 60b and a second insulating member 62b. The first insulating members 60a, 60b and the second insulating members 62a, 62b are configured of an insulating material. Specific examples of the insulating material include synthetic resins such as polyphenylene sulfide (PPS), rubbers such as tetrafluoroethylene-perfluoroalkyl vinyl ether copolymer and ethylene-propylene rubber, and the like. The first insulating members 60a, 60b and the second insulating members 62a, 62b may be configured of the same material or of different materials.

As shown in FIGS. 1 and 2, the battery pack 100 is configured by connecting a plurality of (typically 4 or more, for example 4 to 100, for example, 10 or more) unit cells 10 in series. As described above, the battery case 20 of each unit cell 10 is provided with the positive electrode terminal 30 electrically connected to the positive electrode of the electrode body and the negative electrode terminal 32 electrically connected to the negative electrode. Further, the plurality of unit cells 10 is arranged in a state in which the orientations of the unit cells 10 are alternately reversed so that the respective positive electrode terminals 30 and the negative electrode terminals 32 are arranged alternately.

That is, the positive electrode terminal 30 and the negative electrode terminal 32 of the adjacent unit cells 10 are arranged side by side in the arrangement direction Y so as to be adjacent to each other. Between the adjacent unit cells 10, the positive electrode terminal 30 of one cell and the negative electrode terminal 32 of the other cell are electrically connected by the bus bar 40. The shape, size, number, arrangement, connection method and the like of the unit cells 10 constituting the battery pack 100 are not particularly limited, and can be appropriately changed. Furthermore, for example, a heat radiation member for efficiently dissipating the heat generated by the unit cells 10, a spacer as a length adjustment unit, and the like may be arranged between the unit cells 10.

The bus bar 40 is a plate-shaped conductive member extending in the arrangement direction Y. The bus bar 40 is formed of a metal material, for example, such as aluminum, copper, nickel, stainless steel, and the like. The bus bar 40 has a pair of terminal connection portions 42a, 42b which overlap the positive electrode terminal 30 and the negative electrode terminal 32, respectively, and a linking portion 44 interposed between the pair of terminal connection portions 42a, 42b. In the arrangement direction Y, the terminal connection portions 42a, 42b are disposed at both end portions of the bus bar 40, and the linking portion 44 is disposed at the intermediate portion of the bus bar 40. The bus bar 40 is formed, for example, by pressing a single metal plate. The thickness of the bus bar 40 is not particularly limited, and may be, for example, 0.1 mm to 5 mm, and typically 0.5 mm to 2 mm.

The linking portion 44 is a portion linking the two terminal connection portions 42a. 42b. In this embodiment, the length of the linking portion 44 in the width direction X is larger than the length in the arrangement direction Y. Further, the linking portion 44 has one convex portion 46 bent so as to be positioned above the terminal connection portions 42a, 42b in the height direction Z, and one concave portion 48 bent so as to be positioned below the terminal connection portions 42a. 42b in the height direction Z. The convex portion 46 and the concave portion 48 are arranged side by side along the arrangement direction Y. By bending in this manner to provide the convex portion 46 and the concave portion 48 in the linking portion 44, it is possible to relax effectively the stress applied to the bus bar 40 due to vibrations or the like (in particular, the stress due to the load in the arrangement direction Y and the height direction Z). The number of each of the convex portions 46 and the concave portions 48 is not limited to one. Thus, a plurality (two or more) of the convex portions 46 and/or the concave portions 48 can be used. The number of the convex portions 46 and the concave portions 48 may be the same or different. For example, the linking portion 44 may include two convex portions 46 and one concave portion 48 positioned between the two convex portions 46. The height of the convex portion 46 from the terminal connection portion 42a may be, for example, 0.1 mm to 3 mm, and typically 1 mm to 2 mm (for example, 1.5 mm). The height (depth) of the concave portion 48 from the terminal connection portion 42a may be, for example, 0.1 mm to 3 mm, and typically 0.5 mm to 1 mm (for example, 1 mm).

The terminal connection portions 42a and 42b are portions to be connected to the positive electrode terminal 30 and the negative electrode terminal 32. In this embodiment, the terminal connection portions 42a, 42b have a flat plate shape along the flat surfaces 30a, 32a of the positive electrode terminal 30 and the negative electrode terminal 32. The terminal connection portion 42a is arranged so as to overlap the flat surface 30a of the positive electrode terminal 30. The terminal connection portion 42b is arranged so as to overlap the flat surface 32a of the negative electrode terminal 32. The length La of the terminal connection portions 42a and 42b in the width direction X is larger than the length Lb in the arrangement direction Y. Although not particularly limited, the length La of the terminal connection portions 42a, 42b in the width direction X may be, for example, 10 mm to 100 mm, typically 25 mm to 50 mm. The length Lb of the terminal connection portions 42a, 42b in the arrangement direction Y may be, for example, 5 mm to 80 mm, and typically 15 mm to 40 mm. The terminal connection portions 42a. 42b have the same shape as the positive electrode terminal 30 and the negative electrode terminal 32 of the unit cell 10 in a plan view. The area of the terminal connection portions 42a. 42b in a plan view is equal to or smaller than the area of the positive electrode terminal 30 and the negative electrode terminal 32 in a plan view. The terminal connection portions 42a, 42b are welded to the flat surfaces 30a. 32a of the positive electrode terminal 30 and the negative electrode terminal 32. A method for welding the terminal connection portions 42a, 42b and the external terminals 30, 32 is not particularly limited. For example, a known welding method such as laser welding, resistance welding (for example, spot welding), and the like can be used. In this embodiment, the terminal connection portions 42a, 42b and the external terminals 30, 32 are through-welded by laser welding.

Figure 3:
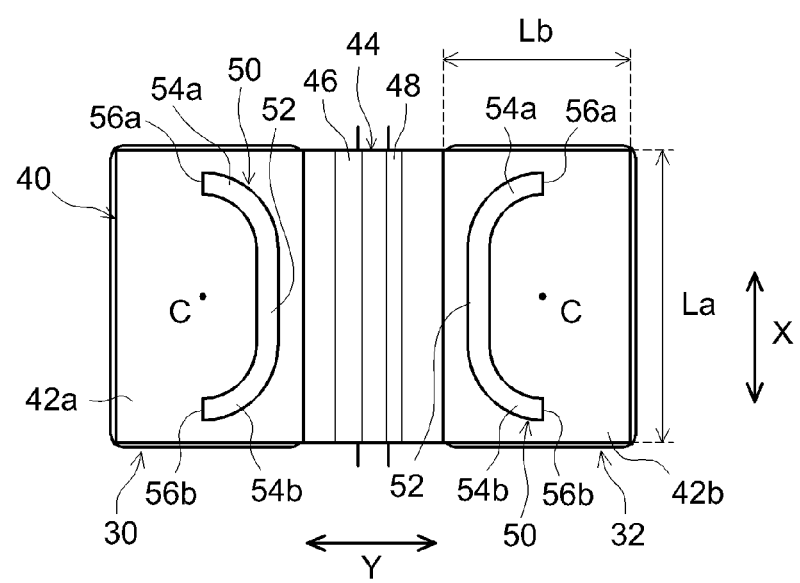
FIG. 3 is a view schematically showing a welding location between a bus bar and an external terminal according to one embodiment.

FIG. 3 is a plan view showing the periphery of the bus bar 40 welded to the external terminals 30, 32. As shown in FIGS. 1 to 3, a linear welded portion (typically, a welding mark) 50 is formed in a portion where the terminal connection portions 42a, 42b and the external terminals 30, 32 overlap with each other. The linear welded portion 50 is non-annular in a plan view (that is, in a plane of the terminal connection portions 42a. 42b) and has a straight linear portion 52 and two circular arc portions 54a, 54b. In this case, the non-annular shape means a linear shape such that a start point 56a and an end point 56b of the linear welded portion 50 are open (not linked), rather than closed, in a plan view.

Figure 4:
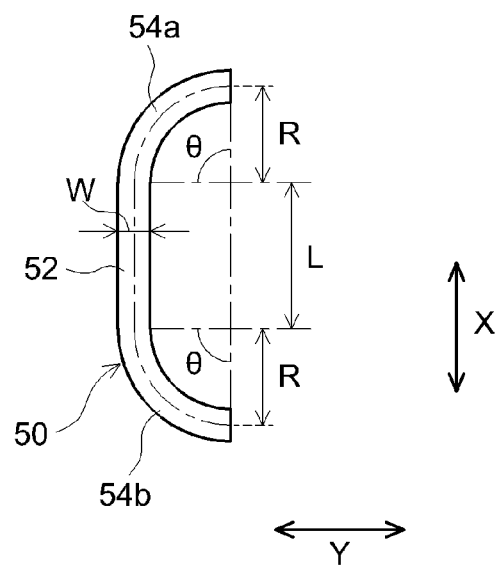
FIG. 4 is a view schematically showing the shape of a welded portion according to one embodiment.

The straight linear portion 52 is a portion of the welded portion 50 that linearly extends in the direction orthogonal to the arrangement direction Y (that is, the width direction X) within the plane of the terminal connection portions 42a, 42b. The length L (FIG. 4) of the straight linear portion 52 in the width direction X may be, for example, 10% or more of the length La (FIG. 3) of the terminal connection portions 42a, 42b in the width direction X (that is, L≥0.1 La). From the viewpoint of better relaxing the stress applied to the bus bar 40 (in particular, the stress due to the load in the Z direction), the length L of the straight linear portion 52 is desirably 15% or more, more desirably 20% or more, even more desirably 25% or more, and particularly desirably 30% or more of the length La. The upper limit value of the length L of the straight linear portion 52 is not particularly limited, and may be, for example, 80% or less of the length La (that is, L≤0.8 La). From the viewpoint of suppressing thermal damage during welding in the external terminals 30, 32 and the first insulating members 60a, 62a, the length L of the straight linear portion 52 is desirably 75% or less, more desirably 60% or less, even more desirably 50% or less, and particularly desirably 40% or less of the length La. The technique disclosed herein can be desirably carried out in an embodiment in which the length L of the straight linear portion 52 in the width direction X is 25% or more and 35% or less of the length La of the terminal connection portions 42a, 42b in the width direction X. Although not particularly limited, the length L of the straight linear portion 52 in the width direction X is, for example, 3 mm to 20 mm, and typically 6 mm to 15 mm (desirably 8 mm to 12 mm).

In this embodiment, the straight linear portion 52 is formed at a position displaced, in the arrangement direction Y, from a center point C of a portion where the terminal connection portions 42a, 42b and the external terminals 30, 32 overlap with each other. In the illustrated example, the straight linear portion 52 is formed at a position displaced, in the arrangement direction Y, from the center point C of the terminal connection portions 42a. 42b toward the side where the linking portion 44 is located (that is, the center side of the bus bar 40). In a desired embodiment, the distance (shortest distance) from the center point C of the terminal connection portions 42a, 42b to the center position of the straight linear portion 52 in the arrangement direction Y is 15% or more, desirably 20% or more, more desirably 25% or more, and even more desirably 30% or more of the length Lb of the terminal connection portions 42a, 42b in the arrangement direction Y. The distance from the center point C to the center position of the straight linear portion 52 is 75% or less, desirably 60% or less, more desirably 50% or less, and even more desirably 40% or less of the length Lb. The distance from the center point C to the center position of the straight linear portion 52 may be, for example, 3 mm or more and 15 mm or less, and desirably 5 mm or more and 10 mm or less.

The two circular arc portions 54a, 54b are portions of the welded portion 50 that extend in a circular arc shape from both ends of the straight linear portion 52 in the plane of the terminal connection portions 42a, 42b. The circular arc portions 54a, 54b extend from respective ends of the straight linear portion 52 and are curved toward the side opposite to the side where the linking portion 44 is located (that is, the center side of the bus bar 40). The radius R (FIG. 4) of the circular arc portions 54a, 54b can be, for example, 50% or less of the length Lb (FIG. 3) in the arrangement direction Y of the terminal connection portions 42a, 42b (that is, R≤0.5Lb). From the viewpoint of better relaxing the stress applied to the bus bar 40 (in particular, the stress due to the load in the X direction and the Z direction), the radius R of the circular arc portions 54a, 54b is desirably 40% or less, more desirably 30% or less, and even more desirably 20% or less. The radius R may be, for example, 10% or less, and typically 5% or less of the Lb. The lower limit value of the radius R of the circular arc portions 54a, 54b is not particularly limited as long as it is 0 (zero) or more, and this radius can be, for example, 0.1% or more of the length Lb (that is, R≥0.01Lb). The radius R of the circular arc portions 54a, 54b is desirably 0.5% or more, more desirably 1% or more, and even more desirably 2% or more of the Lb. The technique disclosed herein can be desirably carried out in an embodiment in which the radius R of the circular arc portions 54a, 54b is 3% or more and 10% or less of the length Lb of the terminal connection portions 42a. 42b in the arrangement direction Y. Although not particularly limited, the radius R of the circular arc portions 54a, 54b is, for example, 0.1 mm to 5 mm, and typically 0.5 mm to 3 mm (desirably 0.8 mm to 2 mm).

In a desired embodiment, the relationship between the length L of the straight linear portion 52 in the width direction X and the radius R of the circular arc portions 54a, 54b satisfies (R/L)<0.2. By setting the size and shape of the welded portion 50 in this manner, the stress applied to the bus bar 40 due to vibrations or the like (in particular, stress due to the load in the X direction and the Z direction) can be better relaxed. From the viewpoint of stress relaxation or the like, the ratio (R/L) is desirably 0.18 or less, more desirably 0.15 or less, and even more desirably 0.12 or less. The lower limit value of the ratio (R/L) is not particularly limited as long as this ratio is 0 (zero) or more, and the ratio is suitably 0.01 or more, desirably 0.03 or more, more desirably 0.05 or more, and even more desirably 0.08 or more.

The central angle θ (FIG. 4) of the circular arc portions 54a, 54b is not particularly limited, and may be, for example, 30 degrees or more and 120 degrees or less. Within this range of the central angle θ of the circular arc portions 54a, 54b, the stress applied to the bus bar 40 due to vibrations or the like (in particular, the stress due to the load in the X direction and the Z direction) can be better relaxed. From the viewpoint of stress relaxation and the like, the central angle θ is desirably 45 degrees or more and 115 degrees or less, more desirably 60 degrees or more and 110 degrees or less, and even more desirably 75 degrees or more and 100 degrees or less. The technique disclosed herein can be desirably carried out in an embodiment in which the central angle θ of the circular arc portions 54a, 54b is 85 degrees or more and 95 degrees or less.

The width W (FIG. 4) of the welded portion 50 is not particularly limited, but it is desirably about 0.1 mm or more. From the viewpoint of joining strength and the like, the width W of the welded portion 50 is desirably 0.3 mm or more, more desirably 0.5 mm or more, and even desirably 0.8 mm or more. In addition, a suitable width W of the welded portion 50 is typically 3 mm or less. From the viewpoint of suppressing thermal damage or the like, the width W of the welded portion 50 may be, for example, 2.5 mm or less, and typically 2 mm or less. Although the joining area of the welded portion 50 in a plan view is not particularly limited, the joining area is desirably approximately 3 mm$^2$ or more. From the viewpoint of joining strength and the like, the joining area of the welded portion 50 is desirably 5 mm$^2$ or more, more desirably 7 mm$^2$ or more, and even more desirably 9 mm$^2$ or more. Further, a suitable joining area of the welded portion 50 is typically 30 mm$^2$ or less. From the viewpoint of suppressing thermal damage or the like, the joining area of the welded portion 50 may be, for example, 20 mm$^2$ or less, and typically 15 mm$^2$ or less.

As described above, the battery pack 100 according to the present embodiment includes, as shown in FIGS. 1 to 4, a plurality of unit cells 10, each unit cell including the electrode body having the positive electrode and the negative electrode, the battery case 20 accommodating the electrode body, and the external terminals 30, 32 attached to the outside the battery case 20. In the plurality of unit cells 10, one external terminal 30 and the other external terminal 32 are linked to each other by the bus bar 40 between the adjacent unit cells 10. The bus bar 40 is a plate-shaped member extending in the arrangement direction Y and has the pair of terminal connection portions 42a, 42b which overlap the respective external terminals 30, 32, and the linking portion 44 for linking the pair of terminal connection portions 42a, 42b. The linear welded portion 50 is formed in portions where the terminal connection portions 42a, 42b of the bus bar 40 and the external terminals 30, 32 overlap with each other. The linear welded portion 50 is non-annular in a plane of the terminal connection portions 42a, 42b and has a straight linear portion 52 which extends in a direction (width direction X) orthogonal to the arrangement direction Y and two circular arc portions 54a, 54b which extend from respective ends of the straight linear portion 52 and are curved toward a side opposite to the side where the linking portion 44 is located. With such a configuration, breakage of the welded portion 50 (eventually, breakage of the bus bar) which may occur when the linear welded portion 50 is provided in a circular shape or a linear shape, as in the battery structures shown in FIGS. 5 to 7, can be suppressed.

Specifically, when the unit cells 10 constituting the battery pack 100 move relative to each other due to vibrations during movement or external impact, stress can be repeatedly applied to the welded portion 50 between the bus bar 40 and the external terminals 30, 32.

Figure 5:
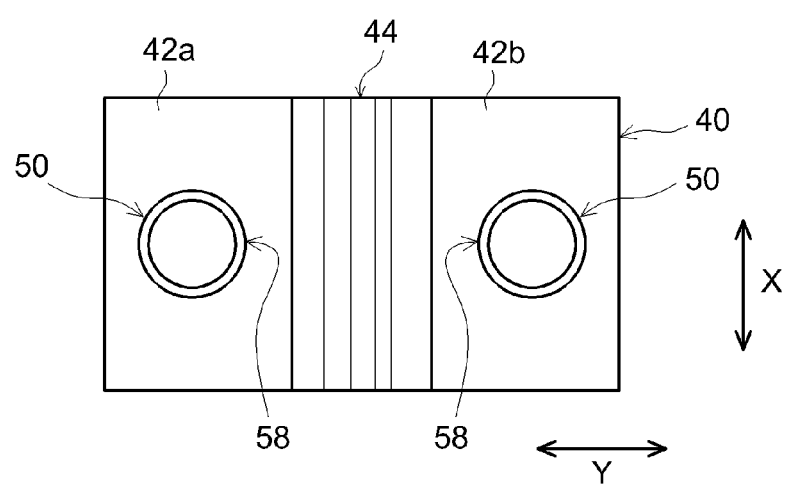
FIG. 5 is a view schematically showing the shape of a welded portion according to a reference example.

At this time, as shown in FIG. 5, where the linear welded portion 50 is provided in a circular shape, the stress caused by the relative movement of unit cells 10 with respect to each other in the width direction X (eventually by the load in the width direction X) through the bus bar 40 can be dispersed by the circular arc portion extending in the width direction X, but the stress caused by the relative movement of the unit cells 10 in the height direction Z (eventually by the load in the height direction Z) is likely to concentrate in one point on the end portion of the welded portion 50 in the arrangement direction Y (in particular, the end portion 58 on the side where the linking portion 44 is located). Therefore, the welded portion 50 can be damaged by the stress caused by the load in the height direction Z.

Figure 6:
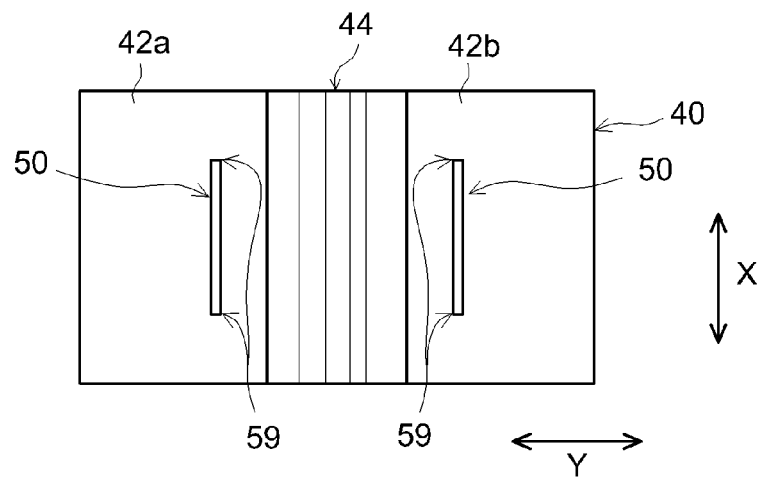
FIG. 6 is a view schematically showing the shape of a welded portion according to a reference example.

Further, as shown in FIG. 6, where the linear welded portion 50 is provided in a straight line, the stress caused by the relative movement of unit cells 10 with respect to each other in the height direction Z (eventually by the load in the height direction Z) through the bus bar 40 can be dispersed by the straight linear portion extending in the width direction X, but the stress caused by the relative movement of the unit cells 10 in the width direction X (eventually by the load in the width direction X) is likely to concentrate in end portions 59 at both ends of the welded portion 50 in the width direction X. Therefore, the welded portion 50 can be damaged by the stress caused by the load in the width direction X.

Figure 7:
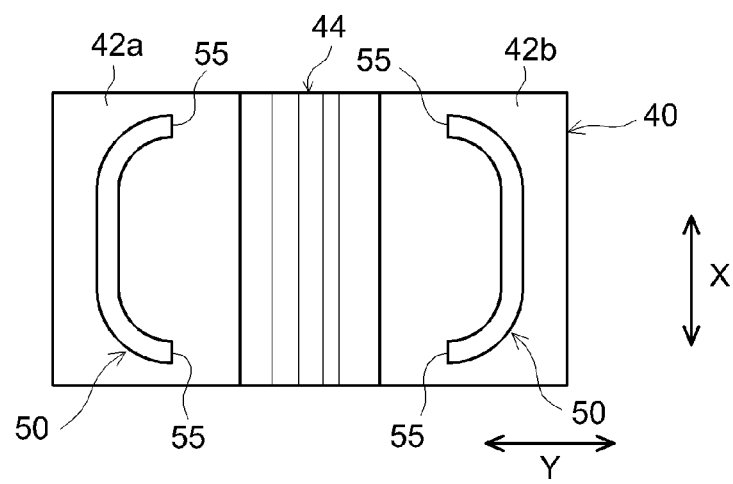
FIG. 7 is a view schematically showing the shape of a welded portion according to a reference example.

Further, as shown in FIG. 7, even in the case where the linear welded portion 50 is provided so as to have a straight linear portion and circular arc portions, where the circular arc portions extend from both ends of the straight linear portion and are curved toward the side where the linking portion 44 is located, the stress caused by the relative movement of unit cells 10 with respect to each other in the width direction X (eventually by the load in the width direction X) through the bus bar 40 can be dispersed by the circular arc portions that curve and extend in the arrangement direction Y, but the stress caused by the relative movement of unit cells 10 with respect to each other in the height direction Z (eventually by the load in the height direction Z) is likely to concentrate in the end portion of the welded portion 50 in the arrangement direction Y (in particular, the end portion 55 on the side where the linking portion 44 is located). Therefore, the welded portion 50 can be damaged by the stress caused by the load in the height direction Z.

Meanwhile, as described above, in the battery pack 100 according to the present embodiment, as shown in FIGS. 1 to 4, the linear welded portion 50 is non-annular and has a straight linear portion 52 extending in a direction (width direction X) orthogonal to the arrangement direction Y and two circular arc portions 54a, 54b which extend from respective ends of the straight linear portion 52 and are curved toward a side opposite to the side where the linking portion 44 is located. Therefore, the stress caused by the relative movement of unit cells 10 with respect to each other in the width direction X (eventually by the load in the width direction X) through the bus bar 40 can be dispersed by the circular arc portions 54a, 54b which curve and extend in the arrangement direction Y. Furthermore, the stress caused by the relative movement of unit cells 10 with respect to each other in the height direction Z (eventually by the load in the height direction Z) can be dispersed by the straight linear portion 52 extending in the width direction X. Therefore, the welded portion 50 is unlikely to be damaged by the stresses caused by the loads in the width direction X and height direction Z. As a result, detachment of the bus bar 40 can be suppressed.

Further, in the above embodiment, the straight linear portion 52 is formed at a position displaced, in the arrangement direction, from the center point C of a portion where the terminal connection portions 42a, 42b of the bus bar 40 and the external terminals 30, 32 overlap with each other. This makes it easier to ensure the space for reworking the welded portion 50 and preliminary welding. That is, when the terminal connection portions 42a, 42b and the external terminals 30, 32 are overlapped with each other and through-welded, it is sometimes impossible to obtain the desired joining area due to lifting of the bus bar 40, welding defects, and the like, and it is necessary to perform reworking or preliminary welding. Also, when the spent unit cell 10 is recycled after being subjected to the regeneration process, it is necessary to reattach the bus bar 40 to the external terminals 30, 32 by welding. Even in the case where such reworking or preliminary welding is required, since the straight linear portion 52 is formed at a position displaced from the center point C, it is easy to ensure a space for welding. Further, in the above embodiment, the straight linear portion 52 is displaced, in the arrangement direction Y, from the center point C toward the side where the linking portion 44 is located. In this manner, the stress caused by the load in the height direction Z can be more effectively relaxed, and the breakage of the welded portion 50 can be reliably suppressed.

Figure 8:
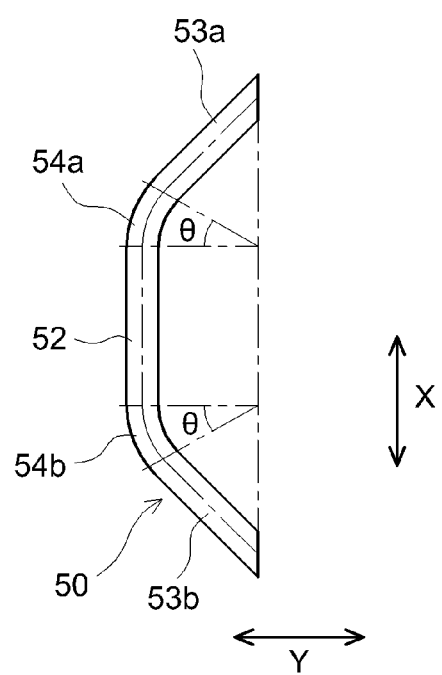
FIG. 8 is a view schematically showing the shape of a welded portion according to another embodiment.
Figure 9:
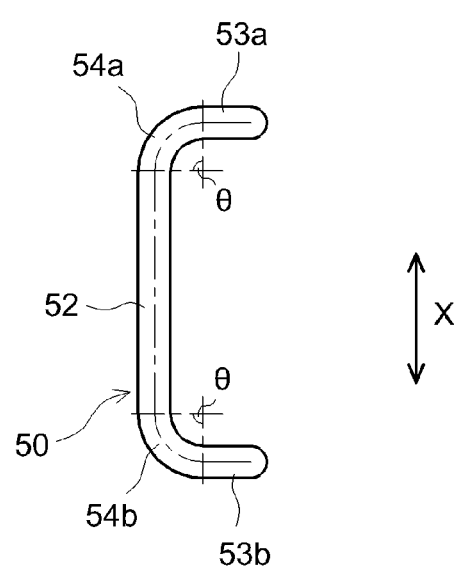
FIG. 9 is a view schematically showing the shape of a welded portion according to another embodiment.

In the embodiment described above, the welded portion 50 has the straight linear portion 52 and two circular arc portions 54a, 54b. The shape of the welded portion 50 is not limited thereto. For example, as shown in FIGS. 8 and 9, the welded portion 50 may have extension portions 53a, 53b linearly extending from the end portions of the circular arc portions 54a, 54b. In the example shown in FIG. 8, the central angle θ of the circular arc portions 54a, 54b is set to less than 90 degrees (for example, 30 degrees to 45 degrees). In the example shown in FIG. 9, the central angle θ of the circular arc portions 54a, 54b is set to 90 degrees. The length of the extension portions 53a, 53b is not particularly limited, and may be, for example, 0.5 mm to 10 mm, typically 1 mm to 8 mm. The above-described operational effect can be obtained even in the case where the extension portions 53a, 53b extending from the circular arc portions 54a, 54b are provided in this way. However, the welded portion 50 without the extension portions 53a, 53b, as in the above-described embodiment, is desirable from the viewpoint of more effectively relaxing the stress.

The inventor of the present teaching tested the operational effect of such battery pack 100.

Here, four angular lithium ion secondary batteries were prepared as the unit cells constituting the evaluation battery pack. As shown in FIGS. 1 to 4, the unit cell 10 includes the battery case 20 accommodating an electrode body, and the positive electrode terminal 30 and the negative electrode terminal 32 attached to the outside of the battery case 20. In the four unit cells 10, one positive electrode terminal 30 and the other negative electrode terminal 32 are linked to each other by a bus bar 40 between the adjacent unit cells 10. The bus bar 40 is a plate-shaped member extending in the arrangement direction Y and has two terminal connection portions 42a, 42b which overlap the positive electrode terminal 30 and the negative electrode terminal 32, respectively, and a linking portion 44 for linking the two terminal connection portions 42a, 42b. The linear welded portion 50 is formed in a portion where the terminal connection portions 42a, 42b of the bus bar 40 and the positive electrode terminal 30 and the negative electrode terminal 32 overlap with each other. The linear welded portion 50 is non-annular and has a straight linear portion 52 which extends in the width direction X, and two circular arc portions 54a, 54b which extend from respective ends of the straight linear portion 52 and are curved toward a side opposite to the side where the linking portion 44 is located.

Samples 1 to 3 have different dimensions (the center line dimension of the welded portion 50) of the welded portion 50. In Sample 1, the length L of the straight linear portion 52 in the width direction X was set to 10 mm, the radius R of the circular arc portions 54a, 54b was set to 1 mm, the central angle θ of the circular arc portions 54a, 54b was set to 90 degrees, and the joining area was set to 13.1 mm$^2$. In Sample 2, the length L of the straight linear portion 52 in the width direction X was set to 10 mm, the radius R of the circular arc portions 54a, 54b was set to 2 mm, the central angle θ of the circular arc portions 54a, 54b was set to 90 degrees, and the joining area was set to 16.3 mm$^2$. In Sample 3, the length L of the straight linear portion 52 in the width direction X was set to 10 mm, the radius R of the circular arc portions 54a, 54b was set to 3 mm, the central angle θ of the circular arc portions 54a, 54b was set to 90 degrees, and the joining area was set to 19.4 mm$^2$.

In Sample 4, as shown in FIG. 9, the extension portions 53a, 53b linearly extending from the end portions of the circular arc portions 54a, 54b were further formed in the welded portion 50. In this example, the length L of the straight linear portion 52 in the width direction X was set to 10 mm, the radius R of the circular arc portions 54a, 54b was set to 1 mm, the central angle θ of the circular arc portions 54a, 54b was set to 90 degrees, and the joining area was set to 15.1 mm$^2$.

In Sample 5, only the straight linear portion 52 was formed in the welded portion 50 without forming the circular arc portions 54a, 54b. In this example, the length L of the straight linear portion 52 in the width direction X was set to 13 mm and the joining area was set to 13 mm$^2$.

In Samples 1 to 5, the width W of the welded portion 50 was fixed at 1 mm.

When the battery pack of each sample was displaced by 0.15 mm in each of the width direction X and the height direction Z by taking the connection portion with one external terminal, among the external terminals 30, 32 connected by the bus bar 40, as a fulcrum, the stress applied to the connection portion of the other external terminal was analyzed using stress analysis software (Abaqus/CAE). The analysis results are shown in Table 1.

TABLE 1

| Sample | Length L (mm) of straight linear portion | Radius R (mm) of circular arc portion | Shape of welded portion | Stress at the time of loading in direction X (MPa) | Stress at the time of loading in direction Z (MPa) |
| --- | --- | --- | --- | --- | --- |
| 1 | 10 | 1 | Straight linear portion + circular are portions | 42.4 | 20.9 |
| 2 | 10 | 2 | Straight linear portion + circular are portions | 55.1 | 29.6 |
| 3 | 10 | 3 | Straight linear portion + circular are portions | 56.9 | 30.6 |
| 4 | 10 | 1 | Straight linear portion + circular are portions + extension portions | 58.2 | 30.7 |
| 5 | 13 | 0 | Straight linear portion | 62.2 | 30.3 |

As shown in Table 1, in Samples 1 to 4 in which the welded portion was provided with the straight linear portion and the circular arc portions, the stress at the time of loading in the X direction (width direction) was relaxed as compared with Sample 5 in which only the straight linear portion was provided. In particular, in Samples 1 to 2 in which only the straight linear portion and the circular arc portions were provided, the stress at the time of loading in the Z direction (height direction) was also relaxed, in addition to the stress at the time of loading in the X direction, as compared with Sample 5 in which only the straight linear portion was provided. These results confirmed that by providing the straight linear portion and the circular arc portions in the welded portion between the bus bar and the external terminal, it is possible to relax the stress applied to the welded portion between the bus bar and the external terminal and to appropriately suppress the breakage of the connection portion.

Although specific examples of the present teaching have been described in detail above, these are merely illustrative and do not limit the scope of the claims. Techniques described in the claims include those in which the concrete examples exemplified above are variously modified and changed.

What is claimed is:

1. A battery pack configured by arranging a plurality of unit cells in a predetermined direction, the battery pack comprising:
    a plurality of unit cells each including an electrode body having a positive electrode and a negative electrode, a battery case accommodating the electrode body, and external terminals attached to the outside of the battery case, wherein
    in the plurality of unit cells, one external terminal and another external terminal are linked to each other by a bus bar between the adjacent unit cells;
    the bus bar is a plate-shaped member extending in the arrangement direction and has two terminal connection portions which overlap the respective external terminals, and a linking portion for linking the two terminal connection portions;
    a linear welded portion is formed in a portion where the terminal connection portion of the bus bar and the external terminal overlap with each other;
    the linear welded portion is non-annular in a plane of the terminal connection portion, and has
    a straight linear portion that extends in a direction orthogonal to the arrangement direction, and
    two circular arc portions that extend from respective ends of the straight linear portion and are curved toward a side opposite to the side where the linking portion is located,
        wherein the straight linear portion is formed at a position displaced, in the arrangement direction, from a center point of the portion where the terminal connection portion overlaps the entire external terminal, toward the side where the linking portion is located.

2. The battery pack according to claim 1, wherein a relationship between a length L of the straight linear portion in a direction perpendicular to the arrangement direction and a radius R of the circular arc portion satisfies (R/L) <0.2.

3. The battery pack according to claim 1, wherein a central angle θ of the circular arc portion is 30 degrees or more and 120 degrees or less.

4. The battery pack according to claim 1, wherein a relationship between a length L of the straight linear portion in a direction perpendicular to the arrangement direction and a radius R of the circular arc portion satisfies (R/L) <0.2.

5. The battery pack according to claim , wherein a central angle θ of the circular arc portion is 30 degrees or more and 120 degrees or less.

6. The battery pack according to claim 2, wherein a central angle θ of the circular arc portion is 30 degrees or more and 120 degrees or less.

* * * * *